United States Patent [19]

Müller et al.

[11] Patent Number: 5,126,383

[45] Date of Patent: Jun. 30, 1992

[54] METAL COMPOUND CONTAINING POLYMER MODIFIED BITUMEN

[75] Inventors: Michael Müller, Bensheim; Otto Hitzler, Erzhausen, both of Fed. Rep. of Germany

[73] Assignee: Rohm GmbH Chemische Fabrik, Darmstadt, Fed. Rep. of Germany

[21] Appl. No.: 664,311

[22] Filed: Mar. 4, 1991

[30] Foreign Application Priority Data

Mar. 2, 1990 [DE] Fed. Rep. of Germany ....... 4006499

[51] Int. Cl.⁵ .............................................. C08L 95/00
[52] U.S. Cl. ...................................... 524/69; 524/70; 524/71; 524/62
[58] Field of Search ................ 524/62, 69, 61, 70, 524/71

[56] References Cited

U.S. PATENT DOCUMENTS

| | | | |
|---|---|---|---|
| 2,420,082 | 5/1947 | Klinger | 524/71 |
| 2,848,429 | 8/1958 | Woodruff et al. | 524/68 |
| 4,833,184 | 5/1989 | Higgins | 524/62 |

FOREIGN PATENT DOCUMENTS

| | | | |
|---|---|---|---|
| 1188807 | of 0000 | Fed. Rep. of Germany | |
| 1240773 | of 0000 | Fed. Rep. of Germany | |
| 2509473 | of 0000 | Fed. Rep. of Germany | |
| 2079268 | 4/1987 | Japan | 524/69 |
| 8704174 | of 0000 | World Int. Prop. O. | |
| 8807067 | of 0000 | World Int. Prop. O. | |

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

Polymer-modified bituminous compositions containing 0.5 to 20% by weight of polymer components, where 20 to 100% by weight of the polymer added is polyalkyl(-meth)acrylate, which in synthesized from 50 to 99.8% by weight from $C_6$ to $C_{28}$ alkyl(meth)acrylates, 0.2 to 20% by weight from polymerizable carboxylic acids and/or sulfonic acids and 0 to 49.8% by weight from one or more other polymerizable, in particular nitrogen-containing compounds. Through the addition of reactive metal compounds, bituminous mixtures with improved elastic recovery, for example ranging from >50% to about 90%, with low temperature flexibility and high thermal stability are obtained.

20 Claims, No Drawings

METAL COMPOUND CONTAINING POLYMER MODIFIED BITUMEN

BACKGROUND OF THE INVENTION

1. Field of the Invention

The invention relates to polymers containing acidic groups and based on polyalkyl(meth)acrylates as a bitumen improver and to bitumens that are improved with such polymers which exhibit improved technical properties.

2. Discussion of the Background

Bitumen, which is a mixture of substantially different hydrocarbons with variable portions of paraffinic, naphthenic and aromatic hydrocarbons, has diverse applications owing to its properties. Examples include the manufacture of street surfaces, as grouting compounds, as coatings, in building protection, in the form of tarpaper and as sealing compounds against ground water.

Bitumens exhibit specific properties which are a function of the origin of the crude oil source of the bitumen. Such properties include negligible or no elasticity and coatings manufactured with them embrittle at low temperatures and soften at higher temperatures.

By adding various additives, in particular polymers, attempts have been made to achieve a hardening of the bitumen, in particular, an improvement of the rheological properties. Bitumen containing additives imparts to asphalt (a mixture of bitumen and mineral matter which is used especially for street construction) adequate stability and low temperature flexibility and a high endurance limit with continuously increasing traffic loads. Thus, the addition of polymers can enlarge the so-called plasticity gap, i.e., the difference between the softening point and the breaking point. A reduction in the breaking point (DIN 52 012) and a increase in the ductility (DIN 52 013) through the addition of polymers indicates better low temperature flexibility. The purpose of the polymers as bitumen additives is to modify the elastic viscous properties of the bitumen. This means the expansion of the plasticity gap and the improvement of elastic recovery.

In addition to natural and synthetic rubbers as polymers, thermosetting resins and thermoplastics have been tested as bitumen improvers (Körner et at., *Plastics and Rubber*, Vol. 24 (1977), pages 475 to 478). Styrene/butadiene (SB), EPDM and ethylene/vinyl acetate (EVA) copolymers have also been used as polymer-bitumen additives, and especially for industrial bitumen, atactic polypropylene has also been used commercially. Commercially available polymer-modified bitumens are ®CARIBIT (SB, Shell), ®OLEXOBIT (EPDM, BP), and ®STYRELF (SB, Elf).

Polymers based on acrylates and methacrylates, in particular polymers of alkyl methacrylates (PAMA) are described as bitumen improvers. Despite good fulfillment of a number of demands imposed on them as additives, these polymers have not found wide commercial use, primarily due to inadequate improvement of the elastic recovery of ready-to-use, elastomer-modified bitumens U.S. Pat. No. 2,420,082 describes bituminous mixtures comprising bitumen and 2 to 5% poly-$C_2$-$C_{10}$-alkyl methacrylates, without specific data about their molecular weights, which improve the ductility of the bitumen.

U.S. Pat. No. 2,848,429 discloses bitumen mixtures that exhibit improved ductility and each of which were obtained by adding 0.01 to 0.5% rubber and poly-$C_8$-$C_{24}$-alkyl(meth)acrylates. The PAMA's have molecular weights ranging from 5,000 to 500,000.

The German DE-AS 12 40 773 and DE-OS 23 31 727 describe bituminous binders for street surfaces, the binders being also improved with polymers of alkyl methacrylates without any detailed and specific information about these polymers.

Furthermore, polyalkyl(meth)acrylates or copolymers of alkyl(meth)acrylates are proposed as bitumen improvers in DEOS 25 09 473. A non-sticky copolymer is described which is a solid at ambient temperature, has molecular weights ranging from 50,000 to 500,000, and is synthesized substantially from alkyl(meth)acrylates with alkyl groups which contain more than 6 carbon atoms, and from 3 to 20 % by weight of basic, nitrogen-containing monomers. Also, in German patent applications P 39 17 816.1 and P 39 25 827.0 polymers are described which contain under 2.8% by weight carboxylic acids incorporated by polymerization and under 2.8% by weight basic nitrogen compounds incorporated by polymerization. Additives polymerized stepwise by emulsion polymerization are known from the Japanese Kokai 52-141,829, and poly-$C_4$-$C_{20}$ alkyl methacrylates having molecular weights ranging from about 5,000 to about 1,000,000 are known from WO 88/07067, and which are contained in quantities ranging from 0.01 to about 10% by weight in the modified bitumen.

Olefinic copolymers, synthesized primarily with acrylic acid or methacrylic acid as reactive comonomers, are described as additives to bituminous materials in the German published patent application 11 88 807 and in WO 87/04 174. According to German 11 88 807, when mixed with the bituminous material, a carboxyl group-containing, rubbery butadiene-acrylonitrile copolymer is cross-linked through the addition of an oxide of a divalent metal, preferably zinc oxide. According to WO 87/04 174, in addition to α-olefin homopolymers and α-olefin-α,β-unsaturated carboxylic acid copolymers, ionomers of the latter copolymer type can also be used as bitumen additives. However, these ionomers have low melt flow indices and cannot be homogeneously incorporated into the bituminous material owing to their cross-linked state.

Prerequisites for polymeric additives, in order to impart improved properties to bituminous mixtures, are oxidation and thermal stability of the polymers, their easy incorporation into bitumens, compatibility with various kinds of bitumen and stability of the bitumen/polymer mixture.

The known polymeric bitumen additives adequately expand the plasticity gap in bituminous mixtures and in mineral blends manufactured with them, i.e., the softening point and breaking point of such materials are often advantageously affected by known polymer additives The high endurance limit and elasticity of the asphalts which are manufactured with bituminous binders and which are defined by the elastic properties of the bitumens, do not yet exist to an adequate or good degree, as shown, for example, in practice by asphalt street surfaces which are severely deformed.

SUMMARY OF THE INVENTION

Therefore, one object of the present invention is to increase the softening points in bituminous materials and significantly improve their elastic properties measured, for example as elastic recovery, where these materials also exhibit the known and requisite properties such as high thermal stability and resistance to oxidation as well as good low temperature stability.

It has been found that reactive polyalkyl(meth)acrylates of specific compositions are effective bitumen additives that can be readily incorporated, exhibit compatibility and with which both the elastic properties of the bitumen and thus bituminous compositions can be significantly improved.

Surprisingly, it has been demonstrated that in polymer-modified bitumen extremely high elastic recovery is achieved by means of polyalky(meth)acrylates of long-chain alkyl esters, which are obtained by copolymerization with polymerizable acid compounds, and through the addition of metal salts to these mixtures The bituminous mixtures also exhibit increased softening points.

DETAILED DESCRIPTION OF THE PREFERRED EMBODIMENTS

The invention is directed to polymer-modified bitumen with improved elastic recovery, achieved through a content of 0.5 to 20% by weight of polymer components, where these polymer components comprise at least 20% by weight polyalkyl(meth)acrylates. The polyalkyl(meth)acrylates contain about 50 to 99.8% by weight of $C_6$-$C_{28}$ alkyl(meth)acrylates, 0.2 to 20% by weight of polymerizable carboxylic acids and/or sulfonic acids and 0 to 49.8% by weight of one or more other polymerizable monomers, preferably nitrogen-containing compounds having no more than one polymerizable double bond. The polyalkyl(meth)acrylate is uniformly distributed in the bitumen, and reactive metal compounds are added to this mixture.

Reactive metal compounds are primarily basic salts of organic and/or inorganic acids of metals and/or the corresponding metal oxides, metal hydroxides, metal carbonates and metal alcoholates.

The polyalkyl(meth)acrylate of the specified composition can be a copolymer of the specified comonomers or a mixture of copolymers prepared from alkyl(meth)acrylates with polymerizable carboxylic acids and/or polymerizable sulfonic acids.

The alkyl(meth)acrylate copolymers and/or mixtures of copolymers for compositions of the invention can be added either as a solution, e.g., in a suitable mineral oil, as an aqueous emulsion or in a pure form to the bitumen or bituminous mixtures. The reactive metal compounds can be incorporated as such or in the form of solutions.

An known from prior art, low temperature flexibility, which can be expressed in the characteristic data of breaking point and ductility, can be improved through the addition of polyalky(meth)acrylates, which have molecular weights in the range of about 50,000 to about 1,000,000, in polymer-modified bitumens. However, the elastic recovery cannot be improved to an adequate degree. Therefore in processed bitumen compounds, e.g., in sealing rings or in street surfaces, lasting deformations must be accepted which may involve high risks, for example from a traffic safety point of view.

The German Specification of the Technical Delivery Conditions for Ready-to-use Polymer-modified Bitumens Tl PmB 88, part 1; as revised on Dec. 30, 1988, requires that the various polymer-modified bitumen types have an elastic recovery of at least 50%. As proof of the elastic properties of ready-to-use, elastomer-modified bitumen, the test for elastic recovery is performed according to the half thread procedure in ductilometer as follows in approximation of DIN 52 013 at 25° C.

Deviating from DIN 52 013, the specimens are drawn out only up to a thread length of 20 cm and after the advance has been stopped, the thread is severed with scissors in the thread center into two half threads. The elastic recovery is defined as the distance between the two ends of the half threads after 30 minutes. It is denoted in %, based on the initial elongation.

A comparison of the bitumen of the present invention with examples of the prior art illustrates the high elastic recoveries and improvements in thermostability in the polymer-modified bitumen of the invention. See the Tables below.

The copolymer additives according to the invention containing polyalkyl(meth)acrylates demonstrate good low temperature flexibility, good resistance to oxidation and good solubility, i.e., easy incorporability into almost all kind of bitumens.

To prepare (meth)acrylic acid alkyl ester copolymers of the invention, long chain alkyl esters of acrylic acid and/or primarily of methacrylic acid having $C_6$ to $C_{28}$, in particular with $C_8$ to $C_{20}$ alkyl groups, preferably with $C_{10}$ to $C_{18}$ alkyl groups in the alcohol moiety are used as monomers.

Examples of such esters are n-hexyl methacrylate, n-octyl methacrylate, 2-ethylhexyl acrylate, 2-ethylhexyl methacrylate, n-decyl methacrylate, isodecyl acrylate, isodecyl methacrylate, dodecyl methacrylate, octadecyl acrylate, octadecyl methacrylate, eicosyl methacrylate, and tricosyl methacrylate, where the long chain alcohols used to prepare the ester are added preferably as synthetic alcohols, which are usually mixtures of various alcohols, in particular in the $C_8$ to $C_{26}$ range. Such alcohols are known and available commercially for example, under the tradenames ®LOROL, ®ALFOL, ®DOBANAL, and ®BEHENYL-SR. One industrial alcohol that can be used to manufacture isodecyl methacrylate is a mixture comprising isodecyl alcohols with an average carbon number (C) of 9.9–10.3.

The bitumen-modified polyalkyl(meth)acrylates are synthesized from 50 to 99.8 % by weight, preferably from 60 to 99.5% by weight and in particular from 80 to 99% by weight of long-chain $C_6$ to $C_{28}$ alkyl esters of acrylic acid and/or primarily of methacrylic acid. Preferred are mixtures of different $C_6$ to $C_{28}$ alkyl esters.

The acid comonomers, carboxylic acids or sulfonic acids, are incorporated in quantities of 0.2 to 20% by weight, preferably 0.2 to 15% by weight, in particular 0.5 to 10% by weight and more preferably 0.75 to 5% by weight into the copolymer or the copolymer to be mixed. Acrylic acid and methacrylic acids are preferred as carboxylic acid monomers. However, maleic acid or its anhydride, crotonic acid or itaconic acids can also, for example, be incorporated together as acidic comonomers exclusively or with acrylic acid and/or methacrylic acid. Monomers with sulfonic acid groups are, for example, 2-sulfonic acid ethyl methacrylate, 2-sulfonic acid ethyl methacrylamide, 2-acrylamido-2-methylpropane sulfonic acid, 2-acrylamido-dodecanesulfonic acid, and styrene sulfonic acid.

One or more other copolymerizable monomers, in proportions of 0 to 49.8% by weight, preferably in proportions of 0 to 30% by weight, may be used to prepare the polyalkyl(meth)acrylates. Monomers that may be used but are not essential, for the preparation-of the copolymers are, for example, acrylates and/or methacrylates of $C_1$ to $C_5$ alcohols, such as methyl methacrylate, isobutyl methacrylate, n-butyl acrylate, isoamyl methacrylate, n-pentyl acrylate, cyclopentyl methacrylate, cyclopentyl acrylate, cyclohexyl methacrylate, cyclohexyl acrylate, 2-hydroxypropyl methacrylate, 2-hydroxyethyl acrylate, tetrahydrofurfuryl methacrylate, multiply alkoxylated methacrylic acid esters, acrylonitrile, acrylamide, methacrylamide, styrene, vinyl acetate and, very preferably, nitrogen-containing basic polymerizable compounds, which are preferably incorporated by polymerization in quantities of 0 to 20%, preferably 0 to 10% by weight into the polyalkyl(meth)acrylate additive.

Examples of basic monomeric compounds are those with secondary or tertiary amino or amido groups or with basic heterocyclic groups. Unsaturated compounds with primary amino groups generally prevent radical polymerization and are unsuitable. In contrast, unsaturated compounds with secondary amino groups, e.g., tert.-butyl-aminoalkyl esters of acrylic acid or methacrylic acid can be polymerized when the hydrogen atom of the amino group is sterically shielded. Preferred monomers with a basic nitrogen atom are the dialkyl aminoalkyl esters or the dialkyl aminoalkyl amides of acrylic acid or methacrylic acid, in particular those with a total of 7 to 16 carbon atoms, and suitable N-alkyl acrylamides or methacrylamides. Examples are dimethylaminoethyl acrylate and methacrylate, dimethylaminopropyl acrylate and methacrylate, dimethylaminobutyl acrylate and methacrylate, N-methylacrylamide, N-methyl methacrylamide, dimethylaminoethyl acrylamide and methacrylamide, and esters or amides which, in place of a dimethylamino group, contain a diethylamino, dipropylamino, dibutylamino, methylethylamino, methylbutylamino, morpholino or piperidino group. Suitable nitrogen-containing monomers include vinyl pyrrolidone, vinyl pyridine, vinyl imidazole, vinyl imidazoline, vinyl pyrazolone, vinyl piperidine, and the acrylates and methacrylates of imidazolylalkanols or imidazolinylalkanols.

To incorporate the polymer components which improve the elastic recovery into the bitumens, the reactive polyalkyl(meth)acrylates are added to bitumen in solution, primarily those in a suitable mineral oil, e.g., a higher viscous, naphthenic oil, in an aqueous emulsion or in pure form. The polyalkyl(meth)acrylates can be prepared according to the usual methods by radical polymerization of monomers in solution or in emulsion, and also in bulk (cf. H. Rauch-Puntigam, Th. Volker, Acryl- and Methacrylverbindungen, Springer-Verlag, Berlin, 1967, especially pages 203, 207, 230-233, 238, 327).

The resulting molecular weight, which is generally over $1 \times 10^4$, preferably greater than $3 \times 10^4$, for the polyalky(meth)acrylates to be used according to the invention, is determined primarily by the quantity of the initiator in proportion to the polymerizable monomers or the use of a regulator, e.g., an alkyl mercaptan and is carried out according to known methods. The molecular weights (Mw, g/mol) of the polymers obtained are measured by light scattering (Ullmanns Encyklopaedia der techn. Chemie, 4th edition, Vol. 15, pages 385 to 387), or they are determined by calibration correlation, nsp/c $= 0.0156 \times Mw^{-0.645}$, where the viscosities (n) are measured according to DIN 7745 with chloroform as solvent at 20° C.

For modification of bitumen according to the method of the invention, polyalkyl(meth)acrylates with acid groups in the molecule and with molecular weights of about $1 \times 10^4$ or greater, in quantities of 0.5 to 20% by weight, preferably of 1 to 10% by weight, and in particular 2 to 8% by weight are added to the bitumen. In addition to the required polyalkyl(meth)acrylates of the invention, the polymer-modified bitumens of the invention may contain known polymers such as polyolefins (polyethylene), ethylene-vinyl-acetate copolymers or acrylonitrile-butadiene-styrene copolymers.

The addition of reactive metal compounds to the bitumen compositions makes it possible to improve the elastic recoveries from values ranging from about 30-55% according to prior art to values of up to about 56-90%. Preferred metals are those in the $1a$, $2a$, $3a$ and $4a$ main groups and the $1b$, $2b$, $4b$, $8$, $9b$, and $10b$ secondary (transition) groups of the Periodic Table of the Elements; Preferred are basic salts of organic and/or inorganic acids of the metals and/or the corresponding metal oxides, metal hydroxides, metal carbonates or metal alcoholates. Suitable metals are primarily the alkali metals such as Li, Na or K; the alkaline earth metals, in particular Mg or Ca; all metals of group 3a, all metals of group 4a, for example Sn and Pb; and of the secondary groups, primarily The metals Cu, Zn, Ti, Zr, Cr, and Fe.

Individual reactive metal compounds are, for example, NaOh, KOH, CaO, Ca(OH)$_2$, Zn(OH)NO$_3$, BiOCl, SbO(NO$_3$), naphthenates of, e.g., Cu, Fe, Pb, and Co or phenolates such as Ca-sulfidized alkyl phenolate in mineral oil (OLOA 219 ®).

The addition of the reactive metal compounds into the largely homogeneous bitumen-polymer mixtures is performed in a temperature range of approximately 60° C. to about 250° C., preferably in a temperature range of about 120 to 180° C., for mastic asphalt, at temperatures greater than 200° C. and in the case of bitumen solutions below 60° to 0° C., e.g., 10° to 30° C., where with good mixing they are incorporated in a dry form or in the form of aqueous or organic solutions or in a dispersed form, e.g., in mineral oil. In so doing, the viscosity of the modified bitumen rises significantly.

The term "bitumen", as used herein means all bitumens that can be used, e.g., in street construction or in roofing or shingle construction or as grouting, sealing or coating compounds.

Other features of the invention will become apparent in the course of the following descriptions of exemplary embodiments which are given for illustration of the invention and are not intended to be limiting thereof.

EXAMPLES

A. Synthesis of the reactive polyalkyl(meth)acrylates (PAMA's)

Example A1—Preparation of a polymer P1

In a 1 liter 4 neck round bottom flask with sabre agitator, reflux condenser and internal thermometer, 200 g of n-octane, 298.5 g of n-decyl methacrylate and 1.5 g of methacrylic acid (MAS )corresponding to 1.3 mole %, were heated to 85° C. while stirring. Upon reaching this temperature, polymerization was started with 0.6 g of tert.-butyl perocotate. Four hours after the reaction started the mixture was post-polymerized through the addition of 0.6 g of tert.-butyl perocotate. Following completion of polymerizations the mixture was diluted with 100 g of n-octane. The total duration of polymerization was 16 hours. A clear, colorless, viscous solution with 50% by weight polymer content was obtained.

The polymer was isolated by diluting with tetrahydrofuran (THF) and subsequently pouring into ethanol and dried at 80° C. in a vacuum-drying oven for 12 hours. (Mw ≃ 890,000 g/mol).

Example A2—Preparation of a polymer P2

In a 1 liter 4 neck round bottom flask with sabre agitator, reflux condenser and internal thermometer, 60 g of naphthenic mineral oil, 333.2 g of isodecyl methacrylate, 3.4 g of methacrylic acid (corresponding to 14 mole %) and 3.4 g of 2-dimethylaminoethyl methacrylate (DMAEMA) were heated to 85° C. while stirring. Upon reaching this temperature, polymerization was started with 0.68 g of tert.-butyl peroctoate.

One hour after the reaction started, the mixture was diluted with 280 g of a naphthenic mineral oil. During polymerization the temperature was held constant. Five hours after the reaction started, the mixture was post-polymerized with 0.68 g of tert.-butyl peroctoate. The total duration of polymerization was 16 hours. A clear, reddish-brown, viscous solution with 50% by weight polymer content was obtained. (Mw of the polymer was about 740,000 g/mol).

Examples A3–A5

The procedure was the same as described in Example 2. In place of the isodecyl methacrylate, however, other alkyl methacrylates were added.

| Example | alkyl methacrylate | MAS | DMAEMA | oil |
|---|---|---|---|---|
| P3 | 334.4 g of a $C_{12-15}$ alkyl methacrylate with average carbon number 13.4 and 23% branched ester content | 2.8 g (2.5% mol %) | 2.8 g | 340 g |
| P4 | 334.4 g of a $C_{12-15}$ alkyl methacrylate with average carbon number 13.4 and 40% branched ester content | 2.8 g (2.5% mol %) | 2.8 g | 340 g |
| P5 | 333.2 g of hexyl methacrylate | 3.4 g (2 mol %) | 3.4 g | 340 g |

In all cases clear, reddish-brown, viscous solutions were obtained. The molecular weights (Mw) of the polymers ranged from 610,000 to 720,000 g/mol.

Example A6—Preparation of a polymer P6

In a 1 liter 4 neck round bottom flask with sabre agitator, reflux condenser and internal thermometer, 60 g of naphthenic mineral oil, 323 g of isodecyl methacrylate and 17 g of methacrylic acid (12.2 mole %) were heated to 85° C. while stirring. Upon reaching this temperature, polymerization was started with 0.68 g of tert.-butyl peroctoate.

Thirty minutes after the reaction started, the mixture was diluted with 280 g of naphthenic mineral oil. After another 3 hours the mixture was diluted again with 170 g of oil and the temperature was raised to 130° C.

Five hours after the reaction started, postpolymerization was started by the addition of 0.68 g of tert.-butyl perbenzoate. The total duration of polymerization was 16 hours. A clear, reddish-brown, viscous solution with 40% by weight polymer content was obtained. The Mw of the polymer was about 640,000 g/mol.

Example A7—Preparation of a polymer P7

In a 1 liter 4 neck round bottom flask with sabre agitator, reflux condenser and internal thermometer, 60 g of naphthenic mineral oil, 336.6 g of isodecyl methacrylate and 3.4 g of methacrylic acid (2.6 mole %) were heated to 85° C. while stirring. Upon reaching this temperature, polymerization was started with 0.68 g of tert.-butyl peroctoate.

One hour after the reaction started the mixture was diluted with 280 g of the mineral oil. Five hours after the start, post-polymerization was started with 0.68 g of tert.-butyl peroctoate. The total duration of polymerization was 16 hours. During the entire time of polymerization, the temperature was held constant. A clear, reddish-brown, viscous solution with 50% by weight polymer content was obtained. The Mw of the polymer was about 670,000 g/mol.

Example A8—Preparation of a polymer P8

In a 1 liter 4 neck round bottom flask with sabre agitator, reflux condenser and internal thermometer, 60 g of naphthenic mineral oil, 326.4 g of isodecyl methacrylate, 3.4 g of methacrylic acid (2.6 mole %) and 10.2 g of 2-dimethylaminoethyl methacrylate were heated to 85° C. while stirring. Upon reaching this temperature, polymerization was started with 0.68 g of tert.-butyl peroctoate.

One hour after the reaction started, the mixture was diluted with 280 g of naphthenic mineral oil. Five hours after the reaction start, post-polymerization was started with 0.68 g of tert.-butyl peroctoate. The total duration of polymerization was 16 hours. During the entire time of polymerizations the temperature was held constant. A clear, reddish-brown, viscous solution with 50% by weight polymer content was obtained. The Mw of the polymer was about 780,000 g/mol.

B. Preparation and testing of polymer-modified bitumens (PmB's)

A commercially available standard bitumen was heated to 150° C. in a flask with sabre agitator. At this temperature the desired quantity of the respective polymer was added and stirred for one hour. After this period of time the polymer was completely incorporated. The polymer-modified bitumen that was obtained was homogeneous and smooth. Subsequently the second additive of the invention (metal compound) was added and the mixture was stirred for another half hour. In the case of aqueous additives, the mixture was cooled to 90° C. prior to addition, the additive was blended and the temperature was subsequently raised again to 150° C. The viscosity of the modified bitumen increased. Gel-like bitumen-polymer mixtures were obtained under some conditions.

The following additives of the invention were used as the second component.

Z1—10% aqueous NaOH,
Z2—solution of 0.984 g NaOH and 0.165 $AlCl_3$ in 8.851 g Water,
Z3—OLOA 219 ®—a 62% solution of a hyperbasic Ca-sulfidized alkyl phenolate in mineral oil, containing approximately 10% by weight $Ca^{2+}$,
Z4—zinc acetate,
Z5—aluminum triisopropylate,
Z6—naphthenic mineral oil.

For comparison purposes the examples also include data of those bitumens to which only one polymer was added but not the second additive of the invention. In this manner the differences with respect to German application P 39 25 827.0 are shown.

Properties and measurement methods

RuK-EP—softening point ring and sphere, DIN 52011
ER—elastic recovery, ductilometer method, modification of DIN 52013
Pene—needle penetration, DIN 52010
BP—breaking point according to Fraas, DIN 52012
TBRK—thermal stress in rotating flask, DIN 52016, Ductility - DIN 52013

Example B1—Bitumen B80 from a German refinery

| B80 | polymer | additive | RuK-EP (°C.) | ER (%) | BP (°C.) |
|---|---|---|---|---|---|
| | — | — | 49 | 13 | −12 |
| 1000 g | 80 g P7 | — | 51 | 21 | — |
| 1000 g | 80 g P7 | 5.4 g Z3 | 59 | 75 | −17 |
| 1000 g | 80 g P7 | 14.4 g Z1 | 59 | 73 | −16 |
| 1000 g | 50 g P1 | 50.0 g Z6 | | | |
| | | −18.0 g Z3 | 54 | 50 | — |
| 1350 g | 108 g P2 | — | 52 | 34 | −17 |
| 1350 g | 108 g P2 | 7.3 g Z3 | 56 | 74 | −17 |

Example B2 - Bitumen B200 from a German refinery

| B200 | polymer | additive | Pene (0.1 mm) | RuK-EP (°C.) | ER (%) | BP (°C.) | ductibility (cm) 13°C | 25°C |
|---|---|---|---|---|---|---|---|---|
| | — | — | 166 | 42 | 30 | −17 | — | >100 |
| 930 g | 77.6 g P7 | — | — | 41 | 59 | −19 | >100 | — |
| 930 g | 77.6 g P7 | 1.67 g Z3 | — | 43 | 67 | — | >100 | — |
| 930 g | 77.6 g P7 | 5.02 g Z3 | 156 | 45 | 85 | −21 | >100 | — |
| 1000 g | 40 g P1 | 23.6 g Z2 | 142 | 60 | 70 | — | — | — |
| 1000 g | 40 g P1 | 23.2 g Z1 | — | 58 | 72 | — | — | — |

Example B3 - Bitumen B80 from a German refinery

| B80 | polymer | additive | Pene (0.1 mm) | RuK-EP (°C.) | ER (%) | BP (°C.) | TBRK (°C.) | (%) |
|---|---|---|---|---|---|---|---|---|
| | — | — | 90 | 46 | 14 | −14.5 | 45 | 11 |
| 1860 g | 148.8 g P2 | — | 124 | 45 | 45 | −21 | — | — |
| 1860 g | 148.8 g P2 | 6.7 g Z3 | 112 | 49 | 79 | −24 | 51 | 70 |
| 780 g | 62.4 g P7 | 2.81 g Z3 | — | 51 | 83 | −23 | — | — |
| 1100 g | 88.0 g P8 | 5.94 g Z3 | — | 50 | 82 | −23 | — | — |
| 970 g | 77.6 g P4 | 10.48 g Z3 | — | 50 | 82 | −22 | — | — |
| 1000 g | 80.0 g P3 | 10.8 g Z3 | — | 48 | 68 | — | — | — |
| 1000 g | 80.0 g P5 | 5.4 g Z3 | — | 49 | 70 | −24 | — | — |
| 800 g | 40 g P1 | 40 g Z6 | — | | | | | |
| | | −18.58 g Z1 | — | 67.2 | 84 | — | — | — |
| 800 g | 40 g P1 | 40 g Z6 | | | | | | |
| | | −18.9 g Z2 | — | 74.6 | 85 | — | 76 | 71 |

Example B4

1,000 g of a bitumen B200 were heated to 150°C. Then 50 g of polymer P1 were added and stirred. After 1 hour, the polymer was completely incorporated. 1.2 g of solid Z4 were then added and stirred for another 2 hours. Acetic acid was liberated. A gel-like bitumen-polymer mixture was obtained and the softening point rose from 41° to 56.5° C.

Example B5

As described in example 4, 100 g of the polymer solution P6 were completely incorporated into 1,000 g of bitumen B80 by stirring for 1 hour at 150°C. The drop-by-drop addition of 0.9 g of Z5 led to a gel-like bitumen-polymer mixture. The softening point rose from 46° to 62° C.

Example B6—Bitumen B65 from an English refinery

| B65 | polymer | additive | RuK-EP (°C.) | ER (%) |
|---|---|---|---|---|
| | — | — | 49 | 9 |
| 1000 g | 80 g P2 | 5.4 g Z3 | 56 | 76 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymer-modified bitumen with improved elastic recovery, comprising:
   bitumen; mixed with
   0.05 to 20% by weight of a polymer component, wherein said polymer component comprises at least 20% by weight of poly-alkyl (meth)acrylate, wherein said polyalkyl(meth)acrylate consists essentially of
   50 to 99.9% by weight of $C_6$ to $C_{28}$ alkyl(meth)acrylate monomers,
   0.2 to 20% by weight of polymerizable carboxylic acid monomers selected from the group consisting of acrylic acid and methacrylic acid, polymerizable sulfonic acid monomers or mixtures thereof, and
   0 to 49.8% by weight of one or more other polymerizable monomers having no more than one polymerizable double bond; and
   a reactive metal compound added to said bitumen-polymer component mixture.

2. The polymer-modified bitumen of claim 1, wherein said reactive metal compound is a basic metal compound.

3. The polymer-modified bitumen of claim 2, wherein said basic metal compound is a metal salt of an organic acid, inorganic acid or mixture thereof, metal oxide, metal hydroxide, metal carbonate or metal alcoholate.

4. The polymer-modified bitumen of claim 1, wherein said metal of said reactive metal compound is in the 1a, 2a, 3a or 4a main groups or the 1b, 2b, 4b, 8, 9b or 10b secondary groups of the Periodic Table of the Elements.

5. The polymer-modified bitumen of claim 1, wherein said polyalkyl(meth) acrylate contains said polymerizable carboxylic acid monomers selected from the group consisting of acrylic acid and methacrylic acid.

6. The polymer-modified bitumen of claim 1, wherein said polyalkyl(meth) acrylate contains said polymerizable sulfonic acids.

7. The polymer-modified bitumen of claim 1, wherein said other polymerizable monomer is 0 to 20% by weight of polymerizable nitrogen-containing compounds.

8. The polymer-modified bitumen of claim 1, wherein said other polymerizable monomer comprises a monomer selected from the group consisting of $C_{1-5}$ alkyl(meth)acrylates, cyclopentyl(meth)acrylates, cyclohexyl(meth)acrylates, 2-hydroxypropyl methacrylate, 2-hydroxyethyl methacrylate, tetrahydrofurfuryl methacrylate or multiply alkoxylated methacrylic acid esters.

9. The polymer-modified bitumen of claim 8, wherein said other polymerizable monomer is a $C_{1-5}$ alkyl(meth)acrylate.

10. The polymer-modified bitumen of claim 1, wherein said alkyl(meth)acrylate monomers comprise $C_{8-20}$ alkyl(meth)acrylate monomers.

11. The polymer-modified bitumen of claim 1, wherein said alkyl(meth)acrylate monomers comprise $C_{10}$-$C_{18}$ alkyl(meth)acrylate monomers.

12. The polymer-modified bitumen of claim 1, wherein said polyalkyl(meth)acrylate comprises 0.2-15 wt.% of said polymerizable carboxylic acid monomers, selected from the group consisting of acrylic acid and methacrylic acid monomers, polymerizable sulfonic acid monomers or mixtures thereof.

13. The polymer-modified bitumen of claim 12, wherein said polyalkyl(meth)acrylate comprises 0.75-5 wt.% of said polymerizable carboxylic acid monomers, polymerizable sulfonic acid monomers or mixtures thereof.

14. The polymer-modified bitumen of claim 4, wherein said metal of said reactive metal compound is an alkali metal.

15. The polymer-modified bitumen of claim 4, wherein said metal of said reactive metal compound is an alkaline earth metal.

16. The polymer-modified bitumen of claim 4, wherein said metal of said reactive metal compound is a metal in Group 3a or 4a of the Periodic Table of the Elements.

17. The polymer-modified bitumen of claim 4, wherein said metal of said reactive metal compound is a metal found in Groups 1b, 2b, 4b, 8, 9b or 10b of the Periodic Table of the Elements.

18. The polymer-modified bitumen of claim 1, wherein said bitumen exhibits an elastic recovery, measured with a ductilometer in accordance with DIN 52013, ranging from 56 to 90%.

19. A process for the preparation of a polymer-modified bitumen having improved elastic recovery, comprising the steps of:

adding to said bitumen an effective amount of a polymer component, wherein said polymer component comprises at least 20% by weight of polyalkyl(meth)acrylate consisting essential of 50-99.8% by weight of $C_{6-28}$-alkyl(meth)acrylate monomers, 0.2-20% by weight polymerizable carboxylic acid monomers selected from the group consisting of acrylic acid and methacrylic acid, sulfonic acid monomers or mixtures thereof, and 0-49.8% by weight of one or more other polymerizable monomers having no more than one polymerizable double bond; mixing said polyalkyl(meth)acrylate with bitumen to form a mixture; and adding to said mixture a reactive metal compound.

20. A method of improving the elastic recovery properties of bitumen, comprising adding to said bitumen an effective amount of a polymer component, wherein said polymer component comprises at least 20% by weight of polyalkyl(meth)acrylate, wherein said polyalkyl(meth)acrylate consists essentially of 50-99.8% by weight of $C_{6-28}$-alkyl(meth)acrylate monomers, 0.2-20% by weight of polymerizable carboxylic acid monomers selected from the group consisting of acrylic acid and methacrylic acid, polymerizable sulfonic acid monomers or mixtures thereof, and 0-49.8% by weight of one or more other polymerizable monomers having no more than one polymerizable double bond;

to form a mixture; and adding to said mixture a reactive metal compound.

* * * * *